United States Patent [19]

Freeman et al.

[11] Patent Number: 4,711,022
[45] Date of Patent: Dec. 8, 1987

[54] METHOD FOR WIRE INSULATION

[76] Inventors: Clarence S. Freeman; Katherine M. Freeman, both of 16242 Katherin La., Channelview, Tex. 77530

[21] Appl. No.: 844,144

[22] Filed: Mar. 26, 1986

[51] Int. Cl.$^4$ .......................................... H01R 43/00
[52] U.S. Cl. .................................... 29/825; 29/402.18; 29/527.2; 427/30; 427/62; 427/117
[58] Field of Search .................. 29/825, 402.18, 527.2; 174/23 R, 23 L; 427/12, 27, 30, 62, 117

[56] References Cited

U.S. PATENT DOCUMENTS

| | | | |
|---|---|---|---|
| 3,661,358 | 5/1972 | Dill | 254/134.3 |
| 3,893,962 | 7/1975 | Walton et al. | 260/28.5 |
| 4,002,819 | 1/1977 | Woytiuk | 174/23 |
| 4,238,638 | 12/1980 | Cretney et al. | 174/23 |
| 4,308,416 | 12/1981 | Herman et al. | 174/23 |

FOREIGN PATENT DOCUMENTS 2566955 6/1984 France .

Primary Examiner—Timothy V. Eley
Attorney, Agent, or Firm—Vaden, Eickenroht, Thompson & Boulware

[57] ABSTRACT

A technique is disclosed for coating or insulation grafting a metallic cationic wire wherein the wire is placed in water in the presence of salts of carboxylate or other appropriate polymers having anionic groups together with a cationic substance, such as lithium. A dc current is then introduced to establish the wire as an anode. By electrolysis action there is established a hydrophobic coating having a polymer-anionic-to-metal-cationic bond with the metal. The procedure of introducing salts of appropriate anionic polymers and cationic substances where there is an insulation break and short between the wires, providing moisture or standing water and a small dc current has been found useful in repairing such breaks by the formation of an electrochemical coating on the exposed anode wire.

4 Claims, 2 Drawing Figures

METHOD FOR WIRE INSULATION

BACKGROUND OF THE INVENTION

1. Field of the Invention

This invention pertains to the insulation of electrical wires and more specifically to treating wires intended for carrying electrical current in such a manner in addition to their ordinary insulation that, in the presence of a bare wire exposure and a small electrical current the wires are electrochemically coated and therefore repaired and protected against further electrical shorts that otherwise would be created in such an environment.

2. Description of the Prior Art

Telephone cables normally comprise a large plurality of wires. Each wire is routinely individually insulated by a plastic coating. These wires in pairs and sometimes in greater number are then wrapped in paper or otherwise to form a second layer of insulation. Finally, the double insulated wires are then enclosed in a plastic jacket or sheath. A petroleum gel is often pressure forced into the end of the cable to help form a moisture barrier.

In use, the wires, through switching equipment and the like, are connected in their respective pairs to one or more small dc power sources to provide the transmission current that is required and eventually to the telephone terminal equipment, namely, one or more telephone transmitters at one end or location and one or more telephone receivers at the other.

In spite of all of the insulation protection afforded, as noted above, nevertheless, all too often, moisture does get into the cable and into the porous intrusions or even breaks in the insulation and causes a conductive path through the moisture from wire to wire. When this happens, the wires either short out altogether or crosstalk is established, thereby disrupting the telephone communications.

In order to dry the wires and correct a short or partial short, the section of cable where the problem occurred must first be isolated. The wires are then exposed, a silica gel is sprinkled into the area and a blow dryer is used to finish the drying. After the moisture is removed, the exposed or bare wires are then rewrapped or spliced and the cable resealed. All of the above is not only messy because of the presence of the petroleum gel, but it is time-consuming and expensive.

Moreover, in addition, it is also well-known that once a problem occurs in a cable section and remedied in the above manner, the problem will likely reoccur in the same area. It is believed that this reoccurrence results because of the abrasive nature of the silica gel. This causes the insulation to wear to reexpose the metal wire and permit moisture again to cause shorts.

U.S. Pat. No. 4,308,416 to Herman, et al. describes the use of water-swellable, water-insoluable polymers in the cable or alternatively in the insulation paper to block water penetration and movement within the cable without resulting in cable breakage as a result of polymer swelling. Suitable polymers for this purpose are prepared by crosslinking an olefinically-unsaturated carboxylic acid with an alkyl acrylate and supplied in amounts of 1% to 10% of the void volume of the cable, preferably 2% to 6% of the void volume. Nevertheless, water leakage in the cable that cannot be absorbed will still cause a short to occur through any intrusion or break in the insulation.

It should be further noted that there is not enough polymer supplied to the attached area according to the Herman, et al. technique to cause electrochemical insulation protection to occur. Herman, et al. polymers are present to absorb some moisture and to cause some swelling to block moisture migration. However, the amount of polymer is limited by the constraints of cable size. If any more polymer were used than that taught by Herman, et al., cable breakage would result.

Therefore, it is a feature of the present invention to provide an improved process for protectively electrochemically coating a bare wire so that even in the presence of intrusions or breaks in the normal insulation of the wire, shorts will not occur between that wire and another wire in the cable.

It is another feature of the present invention to provide an improved method of repairing cable wires after a short has occurred that leaves the repaired area better protected against future shorts from occurring than an unrepaired area.

SUMMARY OF THE INVENTION

The basic process for electrochemically treating or coating a wire in accordance with this invention involves the use of super absorbent salts and/or mixed salts of polymers having terminal anions attached to the backbone of the polymer. The polymers also include one or more noninvolved cationic substances. The polymers and the metallic wire to be protectively coated having a cationic disposition, such as a common copper wire, are then placed in water or at least a moisture environment. A small dc current is then applied to the water in a direction so that the wire becomes an anode. This produces an anionic-cationic electrochemical cross-linking between the polymer and the metal of the wire and results in an hydrophobic coating or insulation graft to the wire.

When the above phenomenon is employed in repairing a break in the insulation of wires within a cable, a combination of the polymers in granular form and in sufficient quantity to establish the coating are sprinkled onto the wires where the insulation break or intrusion is located. Moisture is left present or even added to the area and a small dc electrical current is established. The normal telephone current is sufficient. If the short is metered, it will be noted when the insulation has been established to the anode wire, namely, when the meter shows that there is no longer a short across the wires.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the exemplary embodiment thereto which is illustrated in the drawings, which drawings form a part of this specification. It is to be noted, however, that the appended drawings illustrate only a typically preferred embodiment of the invention and are not to be considered limiting of its scope as the invention may admit to other equally effective embodiments.

In the Drawings.

DESCRIPTION OF THE PREFERRED EMBODIMENT

Figure 1:
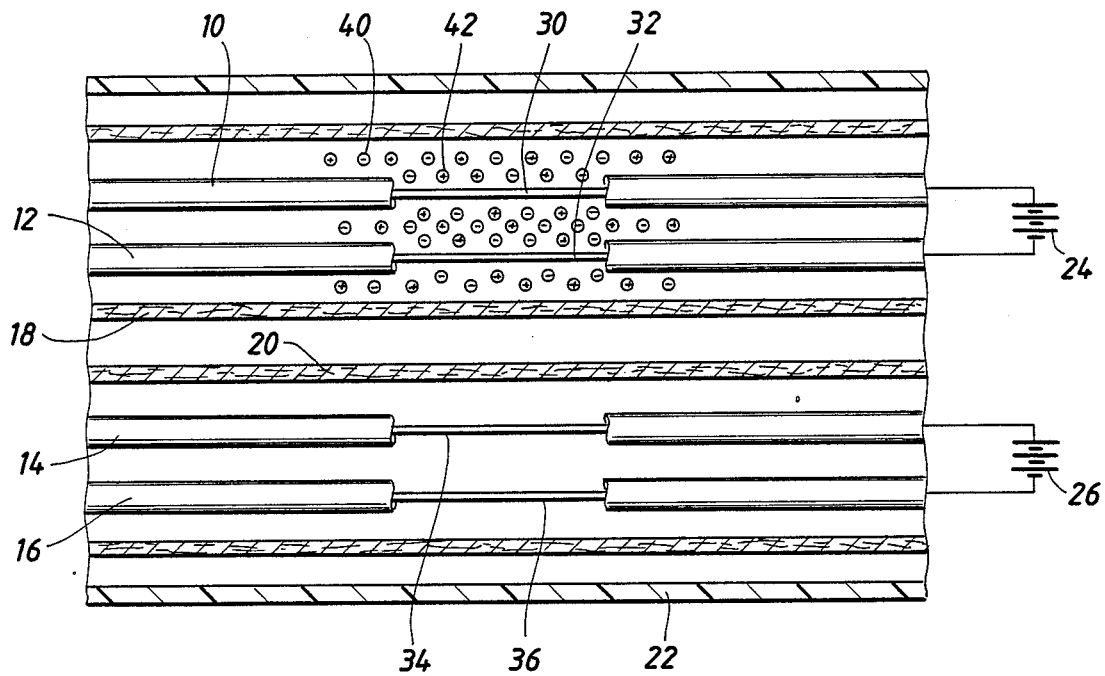
FIG. 1 is a cross-sectional and magnified view of a cable structure suitable for describing the present invention.

Now referring to the drawings and first to FIG. 1, an exemplary simplified telephone cable section is illustrated. The section comprises a plurality of pairs of individually insulated wires such as first pair 10 and 12 and second pair 14 and 16. The conductive wire is typically copper, although the invention is applicable to wires made of other kinds of metal. Pair 10 and 12 are wrapped together with insulation paper 18 and wires 14 and 16 are wrapped together with insulation paper 20. Both pairs are then enclosed in cable jacket or sheath 22.

In actual practice, there are usually many more than two pairs of wire in a cable and more than a single pair can be wrapped together with insulation paper.

Operationally a small dc current is applied to each pair, which is respectively indicated in FIG. 1 as battery 24 connected to wires 10 and 12 and battery 26 connected to wires 14 and 16.

An intrusion or break in the insulation surrounding an individual wire can be caused by bending or stretching the cable, wear in the insulation or impact on the cable or otherwise. The intrusion can be very small, such as one or more porous or pin-hole breaks, or can be a major separation in the insulation. For illustration purposes only, the breaks are shown by bare wire segments 30, 32, 34 and 36, respectively, appearing in wires 10, 12, 14 and 16. Where there is an electrical path between the two wires in a pair, a short is established therebetween. It should be noted that this may be a direct contact between two bare wires. However, a short is more commonly the result of moisture being present in the cable to cause the path. Moreover, the breaks in the insulation of the two wires in a pair do not and are often not opposite one another, but longitudinally are displaced some distance apart.

Figure 2:
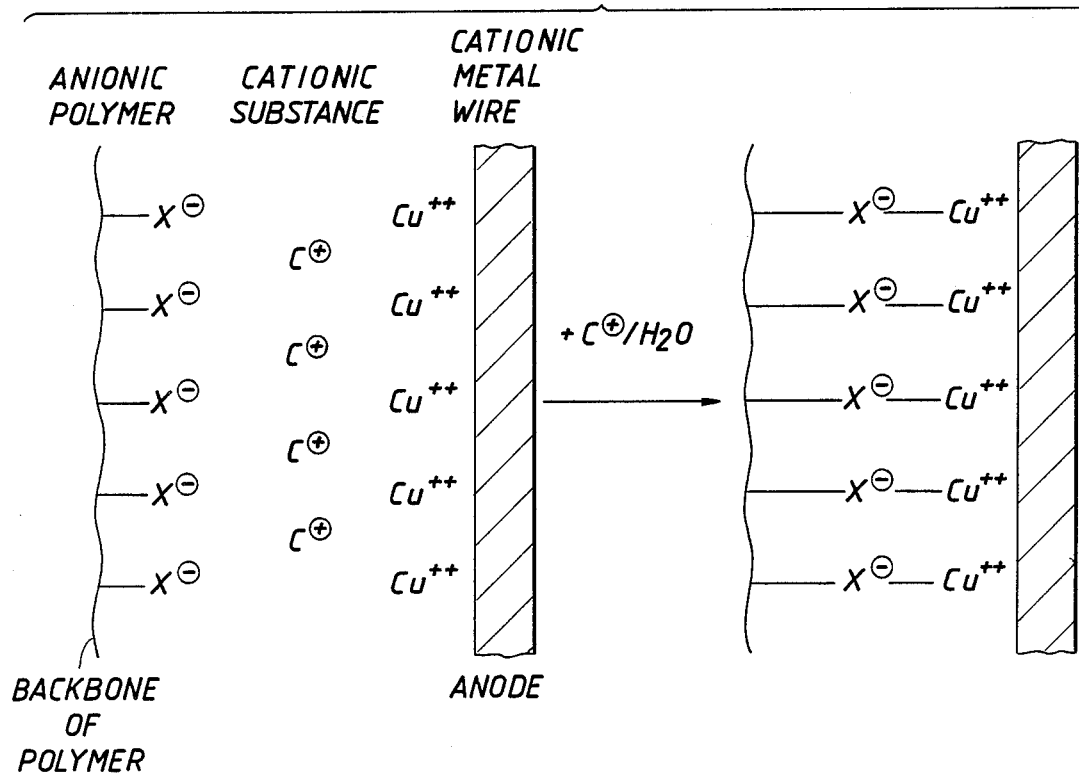
FIG. 2 is an explanatory diagram of the electrochemical cross-linkage action that produces the hydrophobic coating on a wire in accordance with the present invention.

Now referring to FIG. 2, an illustration of the electrochemical reaction in accordance with the present invention is diagrammed. A potentially cationic wire, such as copper, is shown in the presence of water with a carboxylate or other appropriate polymer having a terminal anion connected to the backbone of the polymer. Also present in the polymer are one or more separate and noninvolved cationic substances. That is, this substance is present in the polymer, but does not chemically link with the anionic polymer.

In the presence of a small dc current wherein the wire becomes an electrical anode, the separate substance remains in solution with the water and there is established a hard crosslinkage between the anion attached to the backbone of the polymer and the terminal cation chelated on the surface of the metal wire. That is, under conditions of electrolysis caused by moisture and current the metal wire produces cations on the surface of the anode. These cations are chelated by an anionic group on a polymer chain such as a carboxylate group. The polymer and chelated chain then contacts the metal wire, whereupon the chelated cations are replaced by a metal ion on the surface of the wire to produce a coating of metal-cation-to-carboxylate-anion polymer which binds or grafts to the metal surface. This electrolytic deposition of material is similar to that which is involved in a galvanizing process. The insulation thus developed excludes water and thus insulates the metallic surface against further electrolysis, oxidation and corrosion. In other words, this cross-linkage of the anionic polymer to the wire establishes a hydrophobic coating of the wire that is water repellant and therefore prevents the establishment of an electrical path or short between separate wires.

Many polymers have been investigated that end with a suitable terminal anion, such as carboxylate mentioned above. Additional polymer groups that have suitable anion characteristics are sulfate, phosphate and sulfonate. Wires having a suitable cationic disposition includes wires made of aluminum, nickel, cobalt, chromium, and iron, in addition to wires made of copper. Cationic substances that have the effect of encouraging the electrochemical crosslinkage described above, while not entering into chemical linking themselves, include lithium, sodium, potassium, magnesium, calcium, strontium, barium, aluminum and zinc. It should be noted that some of these substances have a single positive (cationic) charge, others have a double charge and one even has a triple charge. In order for the coating to occur, one or more of the substances has to be present in the polymer.

More specifically, super absorbent salts and/or mixed salts (for example, the alkali metal ions: lithium, $Li^+$; sodium, $Na^+$; potassium, $K^+$; or the alkaline earth metal ions: magnesium, $Mg^{++}$; calcium, $Ca^{++}$; strontium, $Sr^{++}$; barium, $Ba^{++}$; zinc $Zn^{++}$; aluminum, $Al^{+++}$) of cross-linked carboxylate (having a terminal anion structure $—CO_2^-$) polymers and/or co-polymers (for example, covalently cross-linked anionic polyelectrolytes from acrylate, acrylamide, methacrylate, methacrylamide, acrylonitrile, methacrylonitrile, tri- and/or tetraethyleneglycol diacrylate, cellulose, or cellulose derivatives) act as corrosion or oxidation inhibitors for the surface of various metallic "M" substances (for example, copper, Cu; nickel, Ni; cobalt, Co; aluminum, Al; iron, Fe) under conditions of electrolysis caused by moisture or water. Under conditions of electrolysis caused by moisture or water these metals M produce cations ($M^{++}$ or $M^{+++}$) on the surface of the anode. These cations are then chelated by the polymeric carboxylate groups and the carboxylate polymers are cross-linked to produce a coating or graft of a metalcation-to-carboxylate-anion polymer which binds to the metallic surface, thereby excluding water or moisture and thus insulates the metallic surface against further electrolysis, oxidation and/or corrosion.

It has been noted that when all of the linkage that can occur has occurred and the wire is completely coated, the electrolysis migration and cross-linkage action stops.

In a field situation, the phenomenon for coating wire in the manner just described can be employed to repair insulation breaks. After it has been determined that there has been an insulation break in the presence of moisture or water that has caused a short, it is possible to repair the break by first isolating the break using techniques well known in the art. The wires are then separated and salts of carboxylate or other appropriate polymers 40 (FIG. 1) with salts or granules of a cationic substance 42 also present are sprinkled into the area to cover the bare wires. Moisture is not removed but, in fact, if not sufficient, is added so that there is a definite short present between the pair of wires at such break. Low dc current is applied, which can merely be the existing telephone current, to establish the electrolysis migration in the manner discussed above. Shortly, the anode wire of the pair will be electrochemically coated and the current through the short path will stop. It is convenient to meter such action so that it can be determined when the short no longer exists. The cable can then be closed and resealed in conventional fashion.

It should be noted that there is no scraping and baring of wire by mechanical means, which would weaken the strength of the wire. The polymers used in the process also are not abrasive.

While several embodiments have been described and a simplified embodiment illustrated, it will be understood that the invention is not limited thereto, since many modifications may be made and will become apparent to those skilled in the art.

What is claimed is:

1. The process of electrochemically coating a metallic wire made of a metal having a positive ionic disposition, which comprises preparing a water solution including in solution a polymer with anionic groups and at least one non-involved cationic substance, placing the length of the wire to be insulation coated in the solution, and passing a small dc current through the solution so that the wire in solution becomes an anode, the substance with cations being left in solution and a hydrophobic insulation being chelated on the wire, there being an anionic-cationic linkage established between said polymer and the metal of the wire.

2. The process in accordance with claim 1, wherein the metal of the metallic wire is selected from the group consisting of copper, aluminum, nickel, cobalt, chromium and iron.

3. The process in accordance with claim 1, wherein the polymer is selected from the group consisting of a polymer having attached carboxylate groups, a polymer having attached sulfate groups, a polymer having attached phosphate groups, and a polymer having attached sulfonate groups.

4. The process in accordance with claim 1, wherein cationic substance is selected from the group consisting of lithium, sodium, potassium, magnesium, calcium, strontium, barium, aluminum and zinc.

* * * * *

UNITED STATES PATENT AND TRADEMARK OFFICE
CERTIFICATE OF CORRECTION

PATENT NO. : 4,711,022

DATED : December 8, 1987

INVENTOR(S) : Clarence S. Freeman, et al.

It is certified that error appears in the above-identified patent and that said Letters Patent is hereby corrected as shown below: In the drawings, Fig. 2, change the notation in the middle of the drawing from "$+C^{\oplus}/H_2O$" to -- $-C^{\oplus}/H_2O$ --, so that the corrected drawing appears as follows:

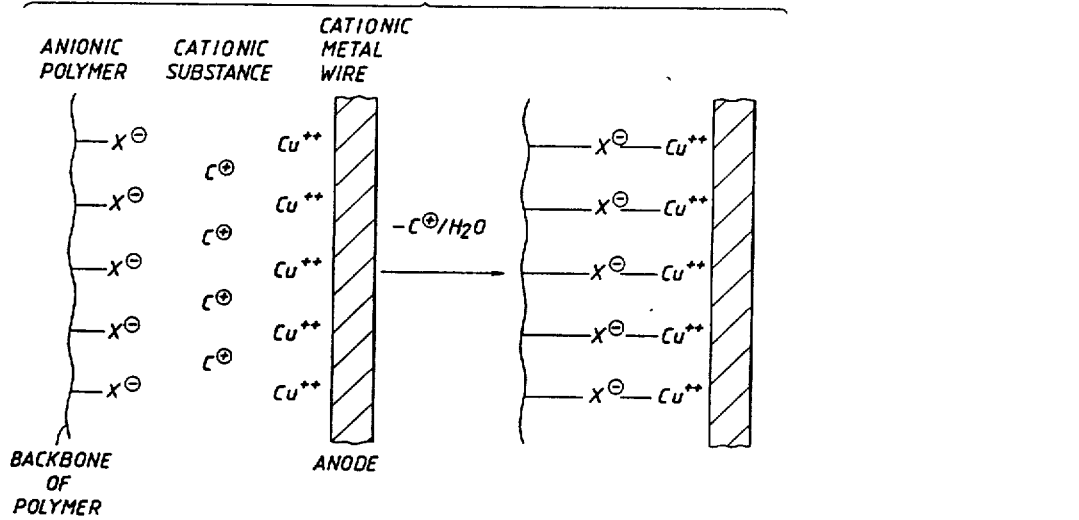

FIG. 2

Signed and Sealed this

Fourth Day of October, 1988

Attest:

DONALD J. QUIGG

*Attesting Officer*   Commissioner of Patents and Trademarks